United States Patent [19]

Ebey

[11] Patent Number: 4,623,125

[45] Date of Patent: Nov. 18, 1986

[54] SWIVEL JACK

[75] Inventor: Edward Ebey, Nashotah, Wis.

[73] Assignee: Fulton Manufacturing Corporation, Milwaukee, Wis.

[21] Appl. No.: 635,066

[22] Filed: Jul. 27, 1984

[51] Int. Cl.$^4$ .............................................. B60S 9/02
[52] U.S. Cl. .................................. 254/420; 254/418
[58] Field of Search ............... 254/45, 418, 420, 423, 254/424, 425; 248/674, 675, 200.1, 291, 284, 286

[56] References Cited

U.S. PATENT DOCUMENTS

| | | | |
|---|---|---|---|
| 2,153,722 | 4/1939 | Loughmiller | 254/86 |
| 2,205,436 | 6/1940 | Richards | 254/86 |
| 2,650,055 | 8/1953 | Perkins | 254/420 |
| 2,784,985 | 3/1957 | Schnell | 280/150.5 |
| 2,851,250 | 9/1958 | Hansen | 254/86 |
| 2,885,181 | 5/1959 | McCully et al. | 254/86 |
| 3,944,259 | 3/1976 | Miller | 280/475 |
| 4,169,579 | 10/1979 | Moll | 254/45 |

FOREIGN PATENT DOCUMENTS 782163  9/1957  United Kingdom ................ 248/291

*Primary Examiner*—Frederick R. Schmidt
*Assistant Examiner*—Judy J. Hartman
*Attorney, Agent, or Firm*—Edgar A. Zarins; Steven L. Permut

[57] ABSTRACT

A jack support for rotatably supporting a jack between the support position and a stored position. The jack support has two brackets with one bracket welded to an outer housing of the jack and a second bracket mounted onto the tongue portion of a trailer. The second bracket attached to the trailer has two lugs that extend therefrom. The first bracket welded to the jack has a slot and a notch therethrough which interconnect with the two lugs. The first bracket can pivot between a support position and a stored position. A spring biased pin is mounted to the first bracket and can be received within one of two holes in the second bracket to fix the support in either the stored or support position.

17 Claims, 11 Drawing Figures

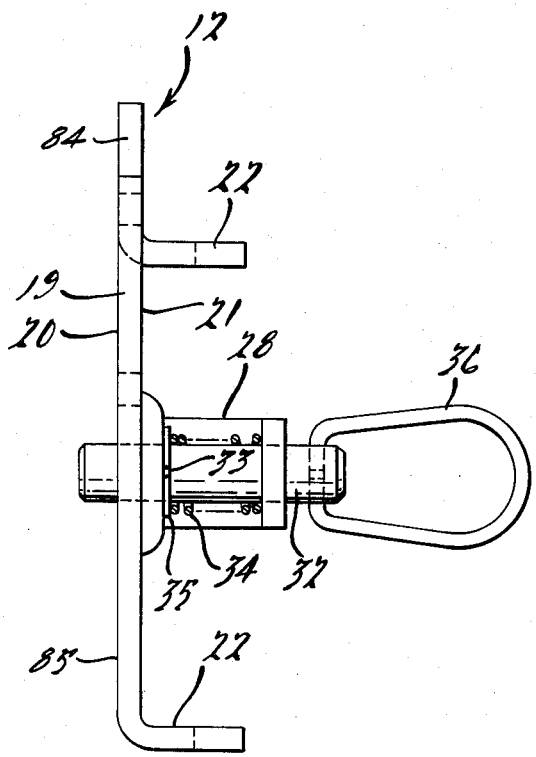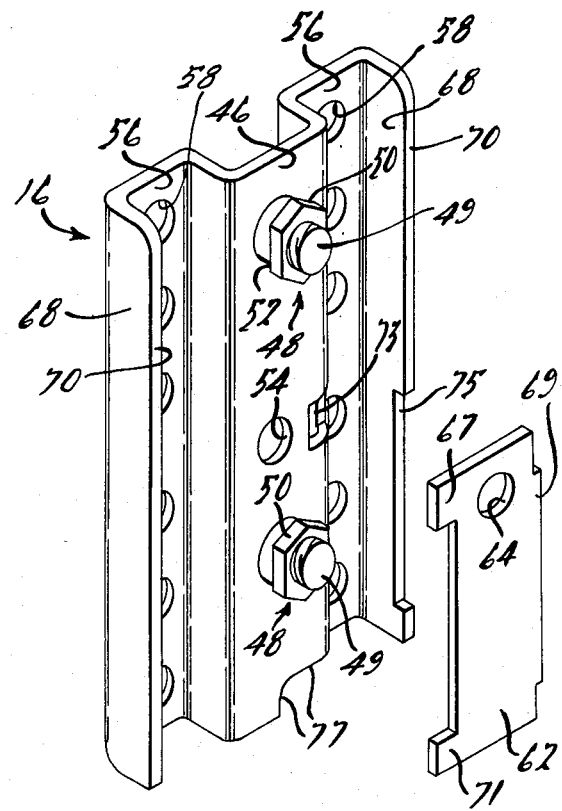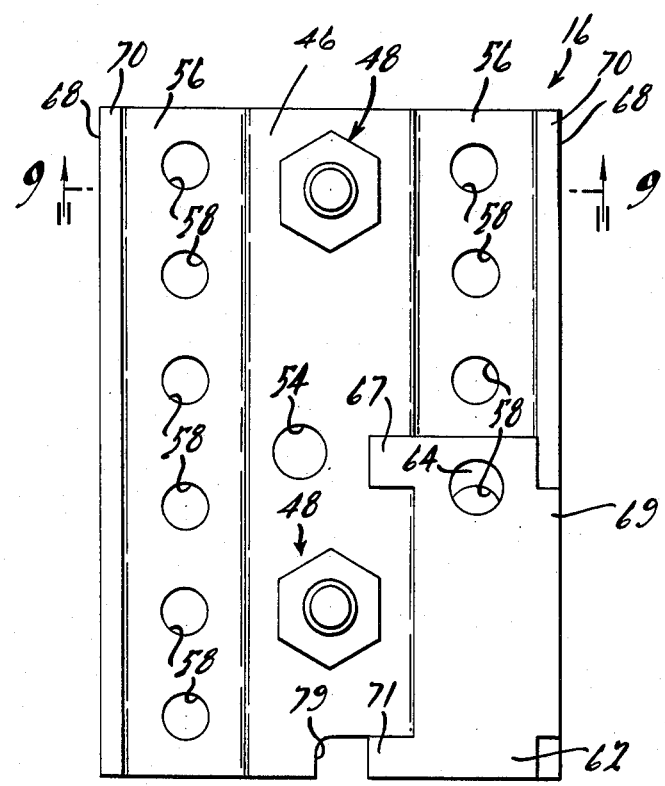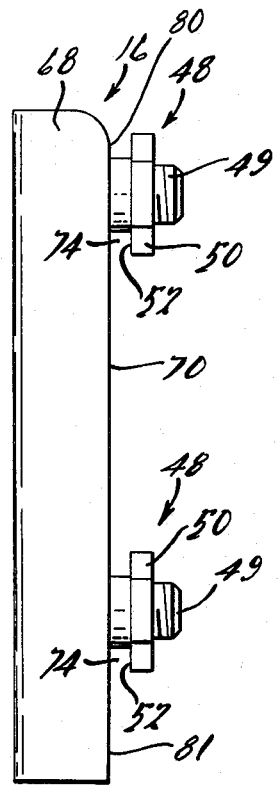

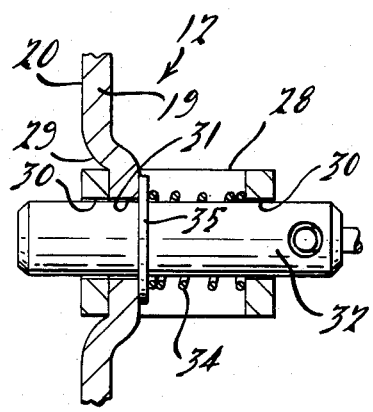
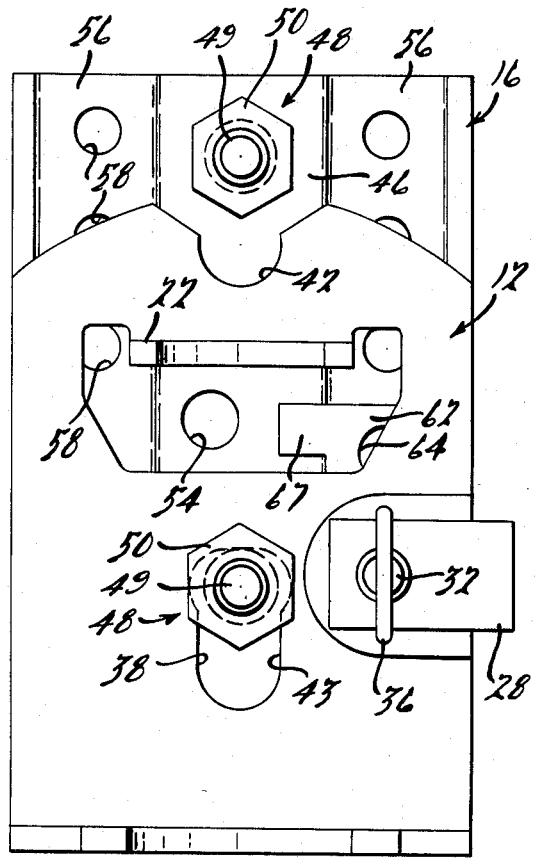
FIG. 8.
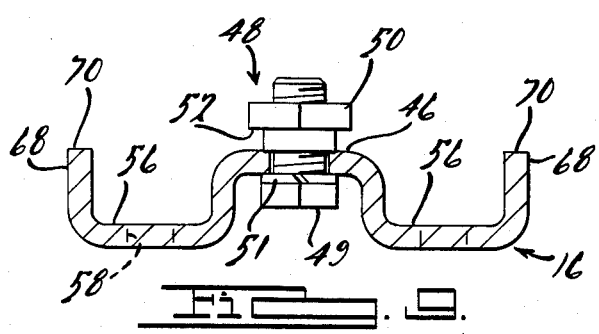
FIG. 9.
FIG. 10.
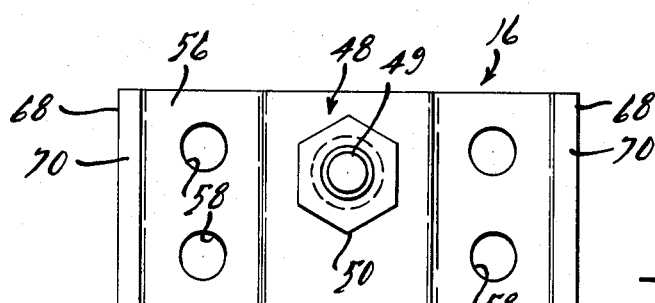
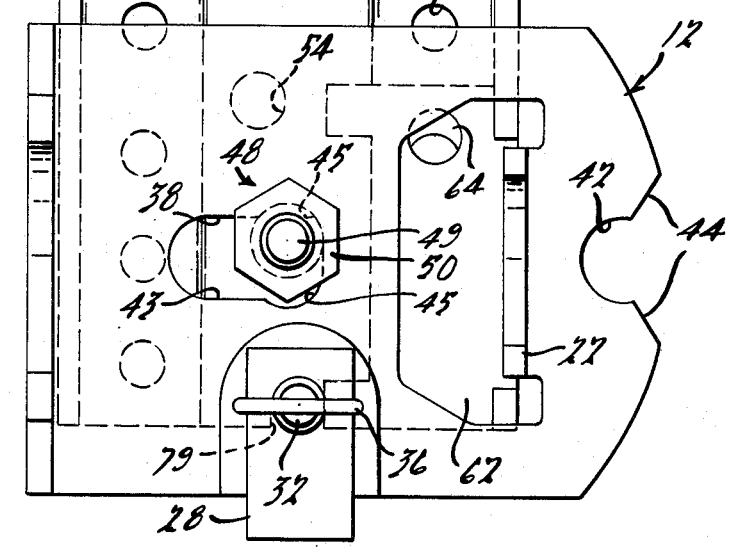
FIG. 11.

SWIVEL JACK

TECHNICAL FIELD

This invention relates to support jacks and more particularly to a retractable jack that is pivotably mounted to a trailer.

DISCLOSURE INFORMATION

Support jacks have long been used with trailers to vertically position the trailer tongue so that it can be mounted onto a hitch of the towing vehicle. In addition, support jacks are often used to keep the trailer level when the trailer is disengaged from the towing vehicle. Often these jacks are pivotally mounted onto the trailer tongue such that they can be pivotally moved to a horizontally stored position when not in use.

U.S. Pat. Nos. 2,205,436 issued to Richards on June 25, 1940 and 2,885,181 issued to McCully et al on May 5, 1959 both disclose a load carrying jack pivotable about one pin and retained in a fixed position by a second removable pin.

U.S. Pat. No. 4,169,579 issued to Moll on Oct. 2, 1979 discloses a retractable jack pivotably mounted about a shaft. A load carrying lock pin is spring loaded and is retractable by manual operation of a lever.

U.S. Pat. No. 2,784,985 issued to Schnell on Mar. 12, 1957 discloses a retractable jack that has an extending arm pivotably mounted between two support plates of a mounting bracket. The arm has a notch which engages a pin fixed to the support plates when in the stored position. The jack also has an integral lug with a retaining pin therethrough. The lug engages a notch within the mounting bracket when in the usable position.

What is needed is a swivel jack support that is compact and yet strong enough to maintain the jack in the support position with a minimum amount of unwanted movement or excess pivoting when directed loads are exerted thereagainst. Also, what is needed is a strong jack support that is economical to manufacture.

SUMMARY OF THE INVENTION

According to the invention, a jack support has a first bracket affixed to a jack housing. A second bracket is affixed to a trailer tongue or, more generally, any supportable body. One of the brackets has a first lug extending therefrom with the other of the brackets having a section that interlockingly and slidably receives the first lug. A second lug extends from one of the brackets and the other of the brackets has a notch therethrough which slidably receives the second lug. The first bracket is slidably movable such that the second lug can disengage from the notch and free the first bracket so that it can pivot about an axis extending through the first lug to a stored position. A lock mechanism selectively retain the first bracket member in the stored position or usable position.

Preferably, the second bracket has both lugs horizontally extending therefrom. The lugs preferably are vertically spaced. The first bracket has a slot therethrough that interlockingly and slidably receives the lower lug and has a notch at its upper end for slidably receiving the upper lug.

It is desirable that each lug has a radially extending retaining shoulder at its outer end that abuts the first bracket member.

It is also desirable that the first and second brackets have peripheral side portions that abut each other to prevent relative rotation of the brackets about an axis that extends transversely through both lugs. In one embodiment, the side portion of the second bracket has two recessed channels with a plurality of apertures therethrough that receive bolts to clamp the second bracket onto the trailer. The second bracket also has flanges at the outer periphery of each channel that abut and retain the first bracket member in a stable position. The recessed channels firstly provide a recessed space for the bolt heads that clamp the second bracket without interfering with the pivotable movement of the first bracket, and secondly provide a convoluted shape to the second bracket that provides additional structural rigidity and support to reduce unwanted movement of the first bracket as it abuts the second bracket under load.

BRIEF DESCRIPTION OF THE DRAWINGS

Reference now is made to the accompanying drawings in which:

FIG. 4 is a side elevational view of the bracket shown in FIG. 3;

FIG. 5 is a fragmentary cross-sectional view taken along lines 5—5 in FIG. 3;

FIG. 6 is a perspective and exploded view of the bracket member that is attached to the trailer tongue;

FIG. 7 is a front elevational view of the bracket shown in FIG. 6;

FIG. 8 is a side elevational view of the bracket shown in FIG. 6;

FIG. 9 is a cross-sectional view taken along line 9—9 shown in FIG. 7;

FIG. 10 is a front elevational view of the jack support in an intermediate position between the support position shown in FIG. 1 and a stored position; and FIG. 11 is a front elevational view showing the jack support in an alternative stored position from that shown in FIG. 2.

DETAILED DESCRIPTION OF THE PREFERRED EMBODIMENT

Figure 1:
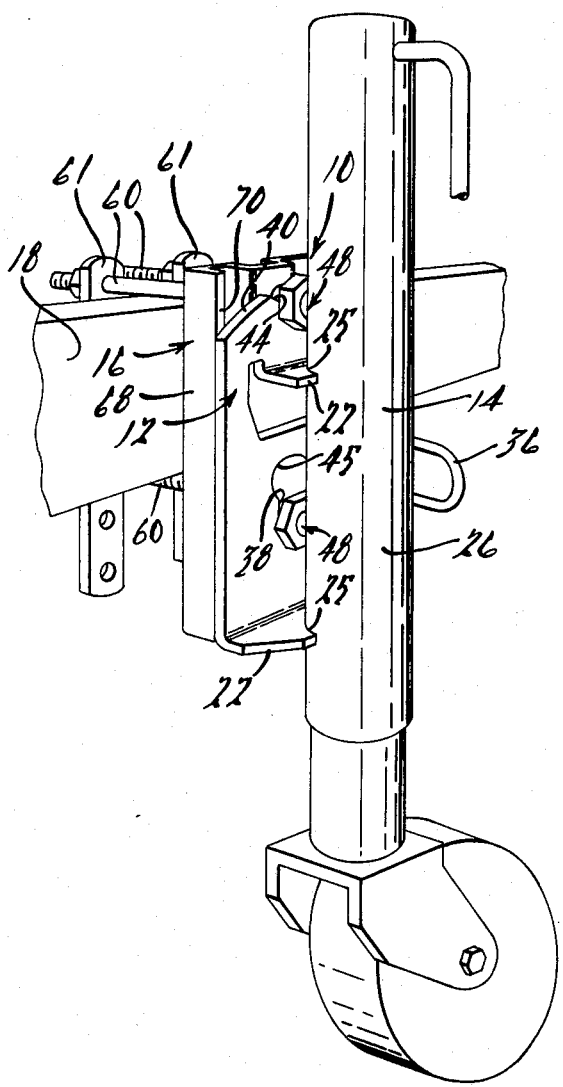
FIG. 1 is a perspective view of a jack and a jack support according to the invention shown supporting a trailer tongue.

Referring now to FIG. 1, a jack support 10 includes a first bracket 12 affixed to jack 14 and a second bracket 16 clamped onto the tongue 18 of a trailer.

Figure 3:
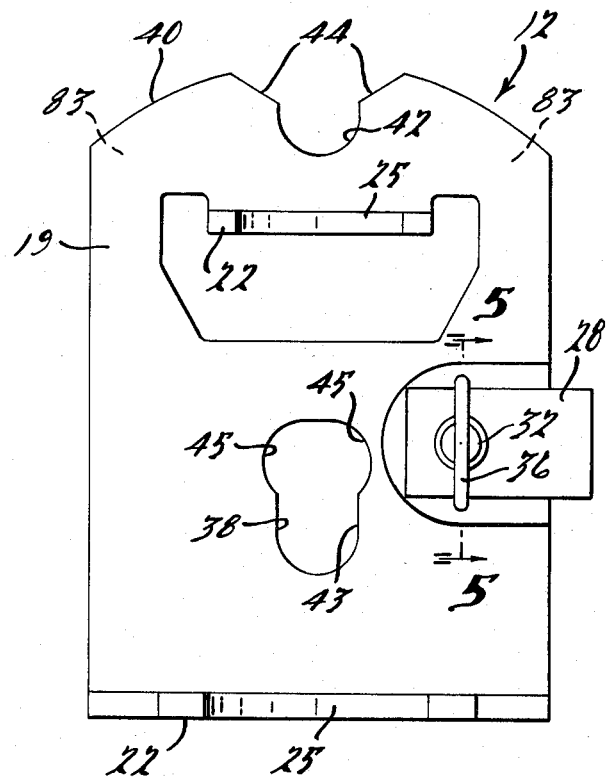
FIG. 3 is an enlarged front elevational view of the bracket that is welded to the jack.

More specifically shown in FIGS. 3, 4 and 5, the first bracket 12, made from 1010 steel, has a planar portion 19 with a planar rear surface 20 and planar front surface 21. Jack supporting flanges 22 extend from the front surface 21. The flanges 22 have a semicircular concave edge 25 which can flushly abut and be welded to the jack outer housing 26. A pin retaining bracket 28 is positioned into a recessed area 29 within rear surface 20 so as not to interrupt the planer integrity of the rear surface as shown in FIG. 5. The bracket 28 and the bracket 12 have apertures 30 and 31 therethrough which receive a pin 32. The pin 32 is biased toward the position shown in FIG. 4 by a spring 34 and lock ring 35 fixed within groove 33 of pin 32. The pin 32 has one end connected to a handle 36. The pin 32 maintains the bracket 28 in its position in recess 29. The spring 34 has a fully compressed length which prevents the pin 32 from retracting out of apertures 30 and 31.

The bracket 12 also has a keyhole 38 positioned between the two flanges 22. The keyhole 38 has a lower slot portion 43 and opposing upper detent portions 45. Vertically spaced above the keyhole 38 at the top edge 40 is a downwardly extending notch 42. The notch 42 is contiguous with inclined centering shoulders 44 that intersect with the convexly curved top edge 40.

Figure 2:
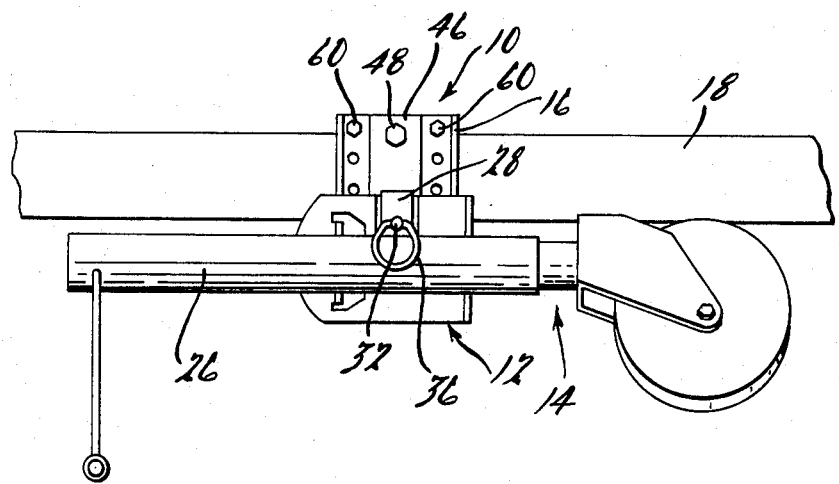
FIG. 2 is a view of the jack and jack support shown in FIG. 1 in a stored position.

Referring now to FIGS. 6-9, the second bracket 16, also made from 1010 steel, has a planar central area 46. Upper and lower parallel lugs 48 extend from this central area 46. Each lug 48 includes a bolt 49, a lock washer 51 and a shoulder nut 50 secured onto the threaded end of bolt 49. The shoulder nut 50 has a retaining shoulder 52 which faces the central area 46. The central area 46 also has an aperture 54 therethrough which is sized to slidably receive pin 32. Two recessed channel sections 56 vertically extend along each side of central area 46. Each channel section 56 has a plurality of apertures 58 therethrough that can receive bolts 60 as shown in FIGS. 1 and 2 which connect the bracket 16 to bracket bars 61. The bracket bars 61 are positioned on the other side of the tongue 18.

Side flanges 68 extend in a transverse direction from channel section 56 and has its forward edge 70 coplanar with central area 46 to define peripheral side portions. The central area 46, channel sections 56, and flanges 68 give the bracket 16 a convoluted cross-sectional shape that provides strength and rigidity. A lock plate 62 spans the right channel section 56 and has extensions 67,69 and 71 fitting into complementary cutouts 73, 75 and 77 in bracket 16 so that the lock plate 62 is coplanar with area 46 and edges 70. The lock plate 62 is retained in this position when the rear surface 20 of bracket 12 abuts thereagainst. The lock plate 62 has an aperture 64 therethrough sized to receive pin 32.

Referring to FIGS. 1, 2, 10 and 11, bracket 12 is placed against bracket 16 such that lower bolt 49 passes through keyhole 38. Shoulder nut 50 is then secured to the lower bolt 49, such that retaining shoulder 52 is spaced from central area 46 a distance 74 that is equal to the thickness of the planar portion 19 of bracket 12. In this fashion, lower lug 48 is slidably and pivotably received in keyhole 38 with retaining shoulders 52 abutting bracket 12.

When the bracket 12 is in a stored position as clearly shown in FIG. 11, pin 32 engages notch 79 formed by bracket 16 and lock plate 62 at a lower edge of bracket 16. Lower lug 48 engages a detent portion 45 of keyhole 38 to retain the bracket 12 in a substantially stable horizontal position which is transverse to the disposition of bracket 16. The bracket 12 jack can also be rotated 180° to the stored position shown in FIG. 2 with pin 32 engaging aperture 54 and lower lug 48 retained in an opposing detent portion 45 of keyhole 38.

The jack support can be pivoted to a usable support position as shown in FIG. 1. The handle 36 is pulled to retract the pin 32 from aperture 54 or notch 79. The bracket 12 is then free to pivot about the lower lug 48. The pin 32 is maintained in the release position against the spring bias by abutting the lock plate 62. The bracket 12 is pivoted and positioned such that the notch 42 is then aligned directly below upper lug 48 as shown in FIG. 10. The bracket 12 can then be slid upwardly such that upper lug 48 is received within notch 42 and lower lug 48 is received in slot portion 43 of keyhole 38. If there is misalignment of notch 42 with respect to upper lug 48, the upper lug 48 will abut one of the inclined shoulders 44 and automatically center itself into notch 42.

When the lug 48 is received in notch 42, the bracket 12 is snuggly fitted within the space 74 between the bracket 16 and retaining shoulder 52 of shoulder nut 50. The bracket 12 is also retained by the center 46 and edges 70 of the flanges 68 abutting the rear surface 20 thereof. Edges 70 abut peripheral side portions 83 of rear surface 20. Upper peripheral portions 80 and 84 abut each other (see FIGS. 4 and 8) and lower peripheral portions 81 and 85 abut each other. Pin 32 aligns with and is received within aperture 64 to automatically lock the bracket 12 into the support position with respect to bracket 16.

If the misalignment is excessive, the upper lug 48 will abut convexly curved upper edge 40 and cam the bracket 12 back toward one of the stored positions not allowing the jack to support any load.

The large horizontal distance between the two edges 70 and the shoulders 52 prevent rotation of bracket 12 about a vertical axis that extends transversely through both lugs 48 because of the abutment of the side peripheral portions 83 with edges 70. In addition, the large vertical extension of the central area 46 and edges 70 forming well spaced apart peripheral portions 80 and 81 along with the retaining shoulders 52 prevents rotation of the bracket 12 along a horizontal axis which passes transversely through one of the lugs 48 because of the abutment of the upper and lower peripheral portions 84 and 85 with portions 80 and 81. In addition, the engagement of the upper lug 48 within notch 42 prevents the bracket 12 from rotating about the lower lug 48 when the bracket 12 is in the support position.

When the jack support is to be moved from the support position as shown in FIG. 1 to a stored position as shown in FIG. 2 or FIG. 11, the handle 36 is pulled such that pin 32 is withdrawn from aperture 64. At this point, the bracket 12 drops such that upper lug 48 disengages from notch 42 as shown in FIG. 10. At this time, the bracket 12 is then free to rotate about the lower lug 48 until pin 32 can re-enter aperture 54 or notch 79 at which time the bracket 12 is then locked in the stored position.

In this fashion, an economical and sturdy jack support can be mounted on the tongue and support a jack. The jack is easily rotated from its stored position to a support position and back to the stored position.

Variations and modifications of the present invention are possible without departing from the scope and spirit as defined in the appended claims.

The embodiments of the invention in which an exclusive property or privilege is claimed are defined as follows:

1. A jack support for securing a jack to a supportable body, said jack support characterized by:
   a first bracket member being rigidly securable to a jack;
   a second bracket member being rigidly securable to the body;
   one of said first and second bracket members having a first engagement means extending therefrom with the other of said first and second bracket members having a first receiving means for slidably receiving said first engagement means;
   interlocking means for retaining the first bracket adjacent the second bracket;

one of said first and second bracket members having a second engagement means with the other of said first and second bracket members having a second receiving means formed in part by a notch therethrough for slidably receiving said second engagement means when said first bracket is in a support position;

said first and second engagement means being substantially parallel to each other;

said first and second brackets having peripheral side portions that abut each other to prevent relative rotation of said brackets about an axis that extends transversely through both said engagement means;

the first bracket member being slidably movable such that said second engagement means is free to exit said notch and said first bracket is then free to pivot about an axis extending axially through said first engagement means to a stored position; and lock means for retaining said second bracket in said stored position.

2. A jack support as defined in claim 1 wherein each engagement means has a retaining shoulder spaced from the bracket from which said respective engagement means extends and said shoulder abuts the respective other bracket.

3. A jack support as defined in claim 2 wherein one of said brackets has convolutions formed in part by recessed channels.

4. A jack support as defined in claim 3 wherein said convoluted bracket is said second bracket; said recessed channels providing a recessed space for mounting bolts which mount said second bracket onto said supportable body without interfering with the pivoting motion of said first bracket member as well as providing structural rigidity to said second bracket.

5. A jack support as defined in claim 4 wherein said lock means includes a lock plate spanning one of said channels;

said lock plate has a lock pin receiving aperture therethrough.

6. A jack support as defined in claim 5 wherein said lock plate is received in cutouts in said second bracket and retained in position by said cutouts and by abutment with said first bracket.

7. A jack support as defined in claim 1 wherein said lock means includes a spring loaded pin mounted onto a pin bracket; said pin bracket including a retaining leg positioned in a recess of one of said first and second brackets, said retaining leg interposed between said first and second brackets.

8. A jack support as defined in claim 1 wherein;
said first receiving means is a keyhole having a slot portion and opposing detent portions.

9. A jack support as defined in claim 1 wherein;
said notch and first receiving means are vertically disposed to provide downward movement of said first bracket with respect to said second bracket for disengagement of said second engagement means from said notch to free said first bracket to move to said stored position.

10. A jack support as defined in claim 1 wherein:
said brackets have peripheral upper and lower portions that abut each other; and said retaining shoulder on each engagement means abuts the respective other bracket on a far side thereof that faces away from the bracket from which said engagement means extend such that rotation of said brackets about a horizontal axis transverse to the pivoting axis through said first engagement means is prevented.

11. A jack support as defined in claim 1 wherein said notch extends from two inclined centering shoulders that guide said second engagement means into said notch if said second engagement means is slightly misaligned from said notch when said second engagement means is attempted to be received within said notch.

12. A jack support as defined in claim 11 wherein an edge of said bracket to which said notch opens up is contoured such that if said second engagement means is severely misaligned with said notch, said second engagement means abuts said edge and said edge cams said first bracket toward the storage position when said second engagement means is attempted to be received within said notch.

13. A jack support for securing a jack to a supportable body, said jack support characterized by:
a first bracket member being rigidly securable to a jack;

a second bracket member being rigidly securable to the supportable body;

said second bracket member having a lower and upper lug horizontally extending therefrom at vertically spaced apart positions;

said first bracket having a slot interlockingly and slidably receiving said lower lug, said slot including opposing detent portions formed perpendicularly thereto;

said first bracket having a notch at its upper end for slidably receiving said upper lug;

said first bracket member being slidably movable downward such that said upper lug disengages from said notch and said first bracket becomes free to pivot about said lower lug to a stored position; and said first and second brackets having peripheral side portions that abut each other to prevent relative rotation of said brackets about an axis that extends transversely through both lugs.

14. A jack support as defined in claim 13 wherein
each lug has a retaining shoulder spaced from the second bracket, said shoulder abuts the first bracket member.

15. A jack support as defined in claim 13 further characterized by:
the side portion of said second bracket having two vertical extending channels with a plurality of clamp receiving means vertically spaced along each channel and an outer flange extending toward and abutting said first bracket.

16. A jack support for securing a jack to a supportable body; said jack support characterized by:
a convoluted bracket having recessed channels;
mounting means in said recessed channels for securing said convoluted bracket to the body;
said convoluted bracket having a central area and two peripheral flanges having abutment edges coplanar with said central area;
an other bracket member being rigidly affixable to a jack and having a generally planar surface in sliding abutment to said central area and peripheral flanges of said convoluted bracket;
means for pivotably moving said other bracket member between a stored position and support position;
means for retaining said other bracket member in said stored and support position.

17. A jack support as defined in claim 16 wherein:

said moving means includes one of said bracket members having a first engagement means for engaging a receiving means in the other of said bracket members for providing pivoting movement of said other bracket member with respect to said convoluted bracket member between said stored position and an intermediate position and sliding movement between the intermediate position and said support position;

said retaining means includes one of said bracket members having a second engagement means for selectively engaging a second receiving means in the other of said bracket members when the brackets are in the support position.

* * * * *